April 6, 1965 C. H. CALLAWAY 3,176,657
ANIMAL HARNESS
Filed April 19, 1963
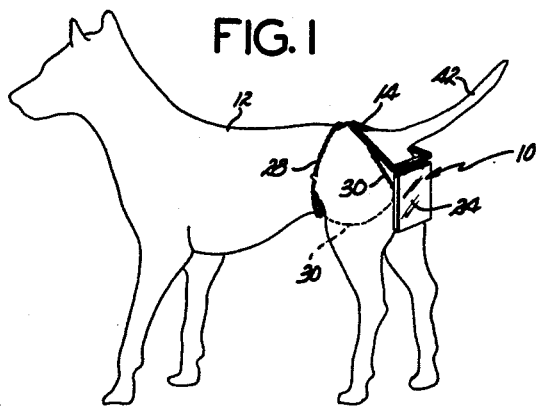
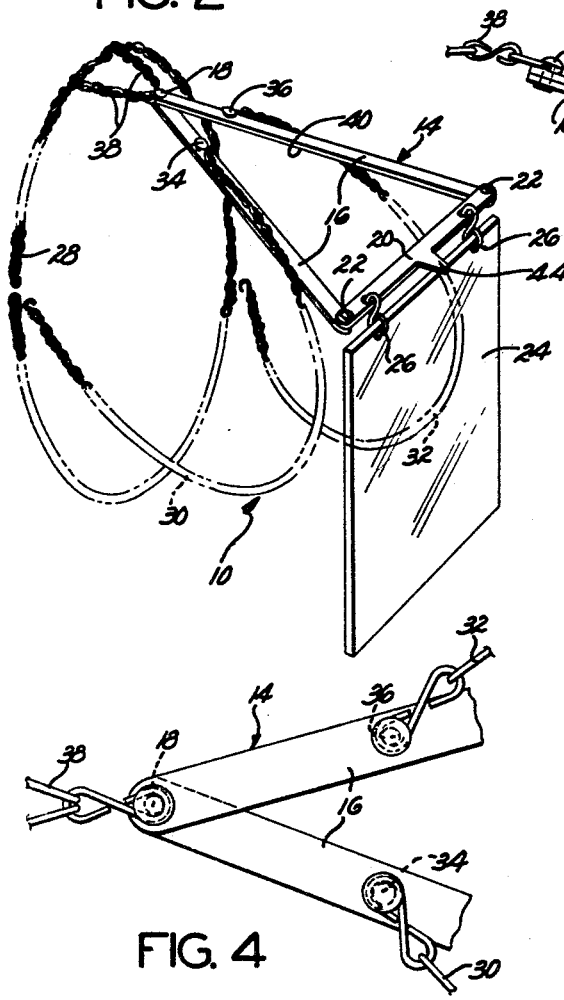
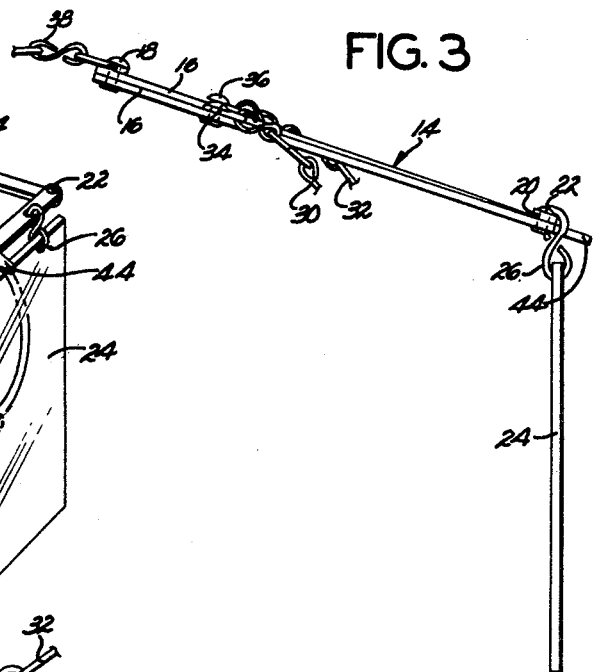
INVENTOR.
CLINTON H. CALLAWAY
BY FULWIDER, PATTON,
RIEBER, LEE & UTECHT
ATTORNEYS 3,176,657
ANIMAL HARNESS
Clinton H. Callaway, 12844 Cowley Ave., Downey, Calif.
Filed Apr. 19, 1963, Ser. No. 274,122
4 Claims. (Cl. 119—143)

The present invention relates to an animal harness for female animals to prevent breeding.

It is an object of the present invention to provide an animal harness which can easily be applied or mounted to the female animal to deny access to males while the female is in heat, and which also permits the female to excrete waste products of its body normally and without restraint by the harness.

It is another object of the invention to provide a harness of the aforementioned character which is particularly suited for application to female dogs, it being understood, however, that references in the description and claims hereof to dogs are not intended to be limiting, but are merely exemplary of one application for the invention.

Another object of the invention is to provide a dog harness of the aforementioned character which is simple to secure upon the dog, and relatively inexpensive to manufacture.

A further object of the invention is to provide a dog harness of the aforementioned character which will prevent mating of the female dog with other dogs, will allow the dog to excrete waste products of the body in a normal manner, and which will remain relatively free of waste eliminations of the dog by reason of its pivotal mounting arrangement.

Another object of the invention is to provide a dog harness of the aforementioned character which includes a rigid croup frame adapted to fit under the tail of the dog and project rearwardly from the hind end of the dog to pivotally mount a protective shield in depending relationship, the shield being adapted to pivot about a substantially horizontal axis for swinging movement into and out of overlying relationship to the generative organ of the dog. The frame and the shield are secured in position upon the dog by girding which includes a continuous loin chain extending around the dog's body and secured to the croup frame, and a pair of crotch chains, each of which is secured at one extremity to the croup frame, is trained between the dog's rear legs, and is secured at its opposite extremity to the loin chain. The utilization of chains to support the croup frame and the protective shield discourages chewing by the dog and enables the harness to be relatively easily cleaned and maintained in substantially sanitary condition. Moreover, the harness is quickly and easily tightened or cinched in position by merely unfastening connected portions of the chains and rehooking or recrimping the chain portions together where desired.

Other objects and features of the invention will become apparent from consideration of the following description taken in connection with the accompanying drawings, in which:

FIG. 1 is a perspective view of a dog wearing a dog harness to prevent breeding, according to the present invention;

FIG. 2 is an enlarged perspective view of the harness, particularly illustrating its position when worn by the dog;

FIG. 3 is a side elevational view of the croup frame and the protective shield depending therefrom, illustrated in the positions these components assume when the dog is standing in a normal, erect position; and FIG. 4 is an enlarged fragmentary plan view of the forward extremely of the croup frame, particularly illustrating the manner in which the loin and crotch chains are secured thereto.

Referring now to the drawings, there is illustrated an animal harness 10 to prevent breeding, and shown in FIG. 1 as the same would be worn by a female dog 12.

The harness 10 comprises a support means or croup frame 14 preferably constituted of a pair of elongated side elements 16 which are rigidly secured together at their converging forward extremities by a rivet 18 or the like, the opposite or diverging extremities of the elements 16 being rigidly secured together by a normally horizontally disposed elongated element 20, a pair of rivets 22 or other suitable fastening elements being disposed through the adjacent extremities of the elements 16 and the element 20 to form a rigid triangular croup structure.

Although the frame 14 may be constructed of any of a number of substantially stiff or rigid materials, it is preferably made of a light material such as aluminum, the rigidity of which is desirable to project and cantilever the element 20 and the rearward extremities of the elements 16 rearwardly of the dog's hind end so that a protective plate or shield 24 depending from the element 20 will hang in a substantially vertical plane slightly spaced from or immediately adjacent the buttocks of the dog 12, as best viewed in FIG. 1.

The shield 24 is substantially rectangular and relatively stiff or rigid, preferably being made of an easily cleaned material such as sheet plastic or the like. The upper margin of the shield 24 is pivotally secured to the element 20 by a pair of transversely spaced-apart chain links 26 whereby the shield 24 is pivotable about a substantially horizontal axis, into and out of overlying relationship to the generative organs of the dog.

The harness 10 includes appropriate girdling for securing the croup frame 14 in position to normally locate the protective shield 24 in overlying relationship to the generative organs of the dog, as previously indicated. The girdling includes a flexible and continuous, body-encircling loin element or chain 28 which completely passes about the dog's body, the girdling also including a pair of flexible and continuous crotch chains 30 and 32 which are trained between the dog's rear legs, as best viewed in FIG. 1. The rearward extremities of the crotch chains 30 and 32 are secured, respectively, to the forward extremities of the pair of elements 16 by a pair of rivets 34 and 36, and the opposite or forward extremities of the crotch chains 30 and 32 are secured at substantially diametrically opposite points of the loin chain 28, approximately midway between the uppermost and lowermost portions of the chain 28.

The upper portion of the loin chain 28 is secured to the ends of the pair of elements 16 by a pair of forwardly diverging chain sections 38 whose forward extremities are transversely spaced apart and secured to the loin chain 28, the opposite or reaward extremities of the chain sections 38 both being secured by the rivet 18 to the adjacent ends of the pair of elements 16.

It will be apparent that the material of the harness 10 is not critical, and that leather straps or the like could be used instead of chains, and the shield 24 could be made of metal, if desired, rather than plastic.

In use, the harness 10 is snugly fitted to the dog 12 so that the dog's hind legs and the tail 42 are engaged by the harness 10 to constrain the harness 10 against forward, rearward, and sideways movement. In this regard, the triangular croup frame 14 defines a central tail-receiving opening 40 through which the dog's tail 42 is placed, locating the horizontal element 20 of the frame 14 beneath the tail 42 to prevent relative forward movement of the harness 10.

The element 20 preferably includes an integral, rearwardly extending limit or stop means constituted by a tab 44, which is disposed above the upper edge of the shield 24 to prevent the shield 24 from being flipped upwardly beyond the plane of the frame 14 and particularly on top of the dog's back. The tab 44 is more important where the dog has a stub tail which is ineffective to limit upward pivotal movement of the shield 24.

The protective shield 24 is continuously effective to prevent access by male dogs, but is also contemporaneously effective to permit the dog to excrete its waste products in a normal manner. More particularly, the shield 24 is projected to the rear of the dog's buttocks by the rigidity of the croup frame 14 a distance sufficient to define a waste passage space between the shield 24 and the dog's buttocks when the dog is in the characteristic squatting position of elimination. Thus, the harness 10 is suspended away from the dog's hind end, and remains relatively free of waste accretions.

It will be particularly apparent that in all normal positions of the dog, the protective shield 24 is in a position overlying the generative organs of the female dog, denying access by male dogs.

Throughout the description herein, reference has been made to utilization of the present device on dogs, but it will be understood that the device can be used with other quadrupeds such as horses, cows, and the like, the attachment means for the shield 24 being easily adapted to various types and sizes of animals.

Various modifications and changes may be made with regard to the foregoing detailed description without departing from the spirit of the invention or the scope of the following claims.

I claim:

1. A dog harness to prevent breeding, said harness comprising:
   support means adapted to be mounted to a female dog adjacent the hind end thereof and including a portion sufficiently rigid for projection beyond said hind end;
   and a protective shield depending from said portion of said support means for location in overlying relationship to the generative organs of the dog and beneath the tail of the dog, said shield being secured to said support means for pivotal movement about a substantially horizontal axis whereby said shield is adapted to swing outwardly when the dog squats, said shield being pivotable independently of the tail of the dog whereby movement of the tail is ineffective to alter said overlying relationship.

2. A dog harness to prevent breeding, said harness comprising:
   a rigid croup frame adapted to fit under the tail of a female dog;
   a protective shield depending from said croup frame and pivotable about a substantially horizontal axis for swinging movement into and out of overlying relationship to the generative organs of the dog;
   and girdling for securing said croup frame on the dog, said girdling including a flexible and continuous loin element adapted to be extended around the dog's body and secured to said croup frame, and a pair of flexible crotch elements, each adapted for securement at one extremity to said croup frame, training between the dog's rear legs, and securement at the opposite extremity to said loin element.

3. A dog harness to prevent breeding, said harness comprising:
   a rigid croup frame adapted to fit under the tail of a female dog;
   a protective shield depending from said croup frame and pivotable about a substantially horizontal axis for swinging movement into and out of overlying relationship to the generative organs of the dog;
   and girdling for securing said croup frame on the dog, said girdling including a continuous loin chain adapted to be extended around the dog's body and secured to said croup frame, and a pair of crotch chains, each adapted for securement at one extremity to said croup frame, training between the dog's rear legs, and securement at the opposite extremity to said loin chain.

4. An animal harness to prevent breeding, said harness comprising:
   support means adapted to be mounted to the female animal adjacent the hind end thereof and including a croup section adapted to fit under the animal's tail and including a portion in spaced relationship to the animal's hind end;
   a protective shield pivotally depending from said portion of said croup section for location in overlying relationship to the generative organs of the animal, said shield being pivotable independently of the tail whereby movement of the tail is ineffective to alter said overlying relationship;
   and stop means for limiting the extent of upward pivotal movement of said shield.

References Cited by the Examiner

UNITED STATES PATENTS

| 808,514 | 12/05 | Crandall | 54—22 |
|---|---|---|---|
| 2,079,053 | 5/37 | Torbert | 54—1 |
| 2,147,291 | 2/39 | Gawiler | 119—143 |
| 2,190,115 | 2/40 | Fuqua | 119—143 |

SAMUEL KOREN, *Primary Examiner.*

HUGH R. CHAMBLEE, *Examiner.*